(12) United States Patent
Kana et al.

(10) Patent No.: US 9,784,844 B2
(45) Date of Patent: Oct. 10, 2017

(54) ARCHITECTURES FOR HIGH INTEGRITY MULTI-CONSTELLATION SOLUTION SEPARATION

(71) Applicant: Honeywell International Inc., Morristown, NJ (US)

(72) Inventors: Zdenek Kana, Dubnany (CZ); Jindrich Dunik, Plzen (CZ); Martin Orejas, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 865 days.

(21) Appl. No.: 14/092,454

(22) Filed: Nov. 27, 2013

(65) Prior Publication Data

US 2015/0145724 A1    May 28, 2015

(51) Int. Cl.
*G01S 19/20* (2010.01)
*G01S 19/42* (2010.01)

(52) U.S. Cl.
CPC ............ *G01S 19/20* (2013.01); *G01S 19/421* (2013.01)

(58) Field of Classification Search
CPC ......... G01S 19/20; G01S 19/33; G01S 19/421
See application file for complete search history.

(56) References Cited

U.S. PATENT DOCUMENTS

| | | | |
|---|---|---|---|
| 5,760,737 A | * | 6/1998 | Brenner ............... G01C 21/165 342/357.58 |
| 5,923,286 A | | 7/1999 | Divakaruni |
| 5,926,132 A | | 7/1999 | Brenner |
| 5,969,672 A | | 10/1999 | Brenner |
| 6,417,802 B1 | | 7/2002 | Diesel |
| 6,864,836 B1 | | 3/2005 | Hatch et al. |

(Continued)

FOREIGN PATENT DOCUMENTS

| | | |
|---|---|---|
| CN | 101806903 | 8/2010 |
| EP | 1729145 | 12/2006 |

OTHER PUBLICATIONS

Lee, Young. "New Advanced RAIM with Improved Availability for Detecting Constellation-wide Faults, Using Two Independent Constellations," Navigation, Journal of the Institute of Navigation, vol. 60, No. 1, Spring 2013,pp. 71-83.*

(Continued)

*Primary Examiner* — Gregory C Issing
(74) *Attorney, Agent, or Firm* — Fogg & Powers LLC

(57) ABSTRACT

A method comprises receiving a plurality of signals from a plurality of space-based satellites, wherein the plurality of space-based satellites comprises at least one space-based satellite from each of a plurality of Navigation Satellite System (NSS) constellations. The method also comprises determining, in a first domain, a first plurality of sub-solutions based on a respective sub-set of the plurality of signals, each respective sub-set in the first domain chosen according to a characteristic defining the first domain; and determining, in a second domain, a second plurality of sub-solutions based on a respective sub-set of the plurality of signals, each respective sub-set in the second domain chosen according to a characteristic defining the second domain. The method further comprises determining if an error is present in the navigation system based on the first plurality of sub-solutions and on the second plurality of sub-solutions.

16 Claims, 9 Drawing Sheets

(56) References Cited

U.S. PATENT DOCUMENTS

| | | | |
|---|---|---|---|
| 7,409,289 | B2 | 8/2008 | Coatantiec |
| 7,436,354 | B2 * | 10/2008 | Lee .......................... G01S 19/46 |
| | | | 342/357.29 |
| 7,711,482 | B2 | 5/2010 | Coatantiec et al. |
| 7,783,425 | B1 | 8/2010 | Hwang et al. |
| 7,911,380 | B2 | 3/2011 | Petillon |
| 7,956,802 | B1 | 6/2011 | Hwang et al. |
| 8,014,948 | B2 | 9/2011 | Vanderwerf |
| 8,019,539 | B2 | 9/2011 | Vanderwerf |
| 8,131,463 | B2 | 3/2012 | Lopez et al. |
| 8,976,064 | B2 | 3/2015 | Brenner |
| 2009/0182493 | A1 | 7/2009 | McDonald et al. |
| 2009/0182494 | A1 | 7/2009 | McDonald et al. |
| 2009/0182495 | A1 | 7/2009 | McDonald et al. |
| 2011/0084874 | A1 | 4/2011 | Coatantiec |
| 2011/0084878 | A1 | 4/2011 | Riley et al. |
| 2011/0316737 | A1 | 12/2011 | Trautenberg |
| 2012/0019411 | A1 | 1/2012 | Trautenberg |
| 2012/0146851 | A1 | 6/2012 | Fernandez |
| 2014/0097984 | A1 * | 4/2014 | Stevens ................... G01S 19/20 |
| | | | 342/357.58 |
| 2014/0292574 | A1 | 10/2014 | Dunik et al. |
| 2015/0145724 | A1 | 5/2015 | Kana et al. |

OTHER PUBLICATIONS

Choi et al."Demonstrations of Multi-Constellation Advanced RAIM for Vertical Guidance Using GPS and GLONASS Signals".Proceedings of ION GNSS 2011, Portland, OR, 8 pages.*
Blanch et al., "An Optimized Multiple Hypothesis RAIM Algorithm for Vertical Guidance", "Proceedings of the 20th International Technical Meeting of the Satellite Division of the Institute of Navigation", Sep. 2007, pp. 2924-2933.
Brenner, Mats, "Integrated GPS/Intertial Fault Detection Availability", "Navigation: Journal of the Institute of Navigation", Mar. 1996, pp. 339-358, vol. 43, No. 2, Publisher: Institute of Navigation, Published in: US.
Jiang et al., "Optimization of the Multiple Hypotheses Solution Spearation RAIM Method", "Proceedings of the 25th Int. Tech. Meeting of the Satellite Division of the U.S. Inst. of Navigation", Sep. 18-21, 2012, pp. 228-234, Published in: US.
Kneissl et al., "Combined Integrity of GPS and Galileo", "Inside GNSS", Jan./Feb. 2010, pp. 52-63.
Madonna et al., "Analysis of Performances of NIORAIM Algorithms Implementation in a GNSS Monitoring System: Verification of Fault Detection Sensitivity in Presence of Bias", "IAIN Conference", Oct. 2009, pp. 1-11.
Dunik et al., "Selected Aspects of Advanced Receiver Autonomous Integrity Monitoring Application to Kalman Filter Based Navigation Filter", "U.S. Appl. No. 13/850,341", filed Mar. 26, 2013, pp. 1-31.
Viola et al., "Design and Implementation of a Single-Frequency L1 Multiconstellation GPS/EGNOS/GLONASS SDR Receiver with NIORAIM FDE Integrity", 2012, pp. 1-10, Publisher: ION 2012 congress.
European Patent Office, "Extended European Search Report from EP Application No. 14190750.1 mailed Nov. 17, 2015", "from Foreign Counterpart of U.S. Appl. No. 14/092,454", Nov. 17, 2015, pp. 1-13, Published in: EP.
Greenspan, "GPS and Inertial Integration", "Global Positioning System: Theory and Applications", Jan. 1, 1996, pp. 187-194, vol. II.
Vanderwerf, "FDE Using Multiple Integrated GPS/Inertial Kalman Filters in the Presence of Temporally and Spatially Correlated IONOSPH", "Proceedings of The Intstitute of Navigation (ION) GPS", Sep. 11-14, 2001, pp. 2676-2685.
European Patent Office, "Partial European Search Report from EP Application No. 14190750.1 mailed May 8, 2015", "from Foreign Counterpart of U.S. Appl. No. 14/092,454", May 8, 2015, pp. 15, Published in: EP.
Kana et al., "Architectures for High Integrity Multi-Constellation Solution Separation", "Proceedings of the 27th International Technical Meeting of the Ion Satellite Division, ION GNSS+ 2014", Sep. 8-12, 2014, pp. 3554-3565.
Lee, "Investigation of Extending Receiver Autonomous integrity Monitoring (RAIM) to Combined Use of Galileo and Modernized GPS", "ION GNSS 17th International Technical Meeting of the Satellite Division", Sep. 21-24, 2004, pp. 1691-1698, Published in: Long Beach, CA.
Lee et al., "Advanced RAIM Based on Inter-Constellation Bomparisons to Detect Consistent Faults for LPV-200", "23rd International Technical Meeting of the Satellite Division of the Institute of Navigation", Sep. 21-24, 2010, pp. 272-284, Published in: Portland, OR.
European Patent Office, "Office Action from EP Application No. 14150944.8 dated Oct. 6, 2015", "from Foreign Counterpart of U.S. Appl. No. 13/850,341", Oct. 6, 2015, pp. 1-8, Published in: EP.
European Patent Office, "Partial EP Search Report from EP Application No. 14150944.8 dated May 11, 2015", "from Foreign Counterpart of U.S. Appl. No. 13/850,341", May 11, 2015, pp. 1-6, Published in: EP.
U.S. Patent and Trademark Office, "Office Action", "U.S. Appl. No. 13/850,341", Sep. 4, 2015, pp. 1-27, Published in: US.
Lee et al., "Feasibility Analysis of RAIM to Provide LPV-200 Approaches with Future GPS", "ION GNSS 20th International Technical Meeting of the Satellite Division", Sep. 2007, pp. 2898-2910.
European Patent Office, "European Search Report from EP Application No. 14150944.8 dated Sep. 18, 2015", "from Foreign Counterpart of U.S. Appl. No. 13/850,341", Sep. 18, 2015, pp. 1-5, Published in: EP.
U.S. Patent and Trademark Office, "Final Office Action", "U.S. Appl. No. 13/850,341", Mar. 18, 2016, pp. 1-23, Published in: US.
U.S. Patent and Trademark Office, "Notice of Allowance", "From U.S. Appl. No. 13/850,341", Sep. 7, 2016, pp. 1-13, Published in: US.
U.S. Patent and Trademark Office, "Office Action", "U.S. Appl. No. 13/850,341", Sep. 4, 2015, pp. 127, Published in: U.S.
Escher et al., "GNSS/IRS Hybridization: Fault Detection and Isolation of More than One Range Failure", "Proceedings of the Institute of Navigation GPS 2002", Sep. 24-27, 2002, pp. 2619-2629, Published in: Portland, OR.
Lee et al, "Feasibility Analysis of RAIM to Provide LPV-200 Approaches with Future GPS", "ION GNSS 20th International Technical Meeting of the Satellite Division", Sep. 2007, pp. 2898-2910.
Orejas et al., "Multiconstellation GNSS/INS to Support LPV200 Approaches and Autolanding", "25th International Technical Meeting of the Satellite Division of the Institute of Navigation", Sep. 17-21, 2012, pp. 790-809, Published in: Nashville, TN.
Rippl, "Real Time Advanced Receiver Autonomous Integrity Monitoring in DLR's Multi-Antenna GNSS Receiver", "International Technical Meeting (ITM) of the Institute of Navigation", Jan. 1, 2012, pp. 1767-1776, Published in: Newport Beach, CA.
Young et al., "Advanced Fault Detection and Exclusion with Future GNSS Constellations", "Proceedings to the 25th International Technical Meeting of the Satellite Division of the Institute of Navigation (ION GNSS 2012)", Sep. 21, 2012, pp. 2758-2763.

* cited by examiner

ARCHITECTURES FOR HIGH INTEGRITY MULTI-CONSTELLATION SOLUTION SEPARATION

BACKGROUND

A global navigation satellite system (GNSS) is a system of space-based satellites that provides autonomous geo-spatial positioning with global coverage. Generally, a GNSS allows receivers to determine their location using time signals transmitted along a line-of-sight from the satellites. The Global Positioning System (GPS) is a GNSS that is maintained by the United States government and can be used by anyone with a GPS receiver. Similarly, GLONASS is a navigation satellite system maintained by Russia. The Galileo system is another GNSS that is currently being built by the European Union (EU) and European Space Agency (ESA). COMPASS is a navigation satellite system being developed by China.

A GNSS provides location information anywhere on or near the Earth where there is an unobstructed line of sight to four or more GNSS satellites (assuming synchronized time among the particular GNSS constellations). A processor coupled to the GNSS receiver uses at least four of the distances from the receiver to the satellites, known as pseudoranges, to accurately estimate the position of the receiver. The accuracy of the estimated position, or position solution, varies as changing atmospheric conditions affect signal-to-noise ratios and signal transit times. The accuracy also varies as the orbiting satellites occasionally experience protracted failures during which they continue to operate while providing erroneous or extra-noisy signals. These and other factors appear as random noise in the transmitted signals, random errors in the computed pseudoranges, and ultimately as a random error in the position solution itself.

SUMMARY

In one embodiment, a method of integrity monitoring for errors in a navigation system is provided. The method comprises receiving a plurality of signals, each signal transmitted from a respective one of a plurality of space-based satellites, wherein the plurality of space-based satellites comprises at least one space-based satellite from each of a plurality (at least two) of Navigation Satellite System (NSS) constellations. The method also comprises determining, in a first domain, a first plurality of sub-solutions for the navigation system, wherein each sub-solution in the first plurality of sub-solutions is determined based on a respective sub-set of the plurality of signals, each respective sub-set in the first domain chosen according to a characteristic defining the first domain; and determining, in a second domain, a second plurality of sub-solutions for the navigation system, wherein each sub-solution in the second plurality of sub-solutions is determined based on a respective sub-set of the plurality of signals, each respective sub-set in the second domain chosen according to a characteristic defining the second domain. The method further comprises determining if an error is present in the navigation system based, at least in part, on the first plurality of sub-solutions in the first domain and on the second plurality of sub-solutions in the second domain.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
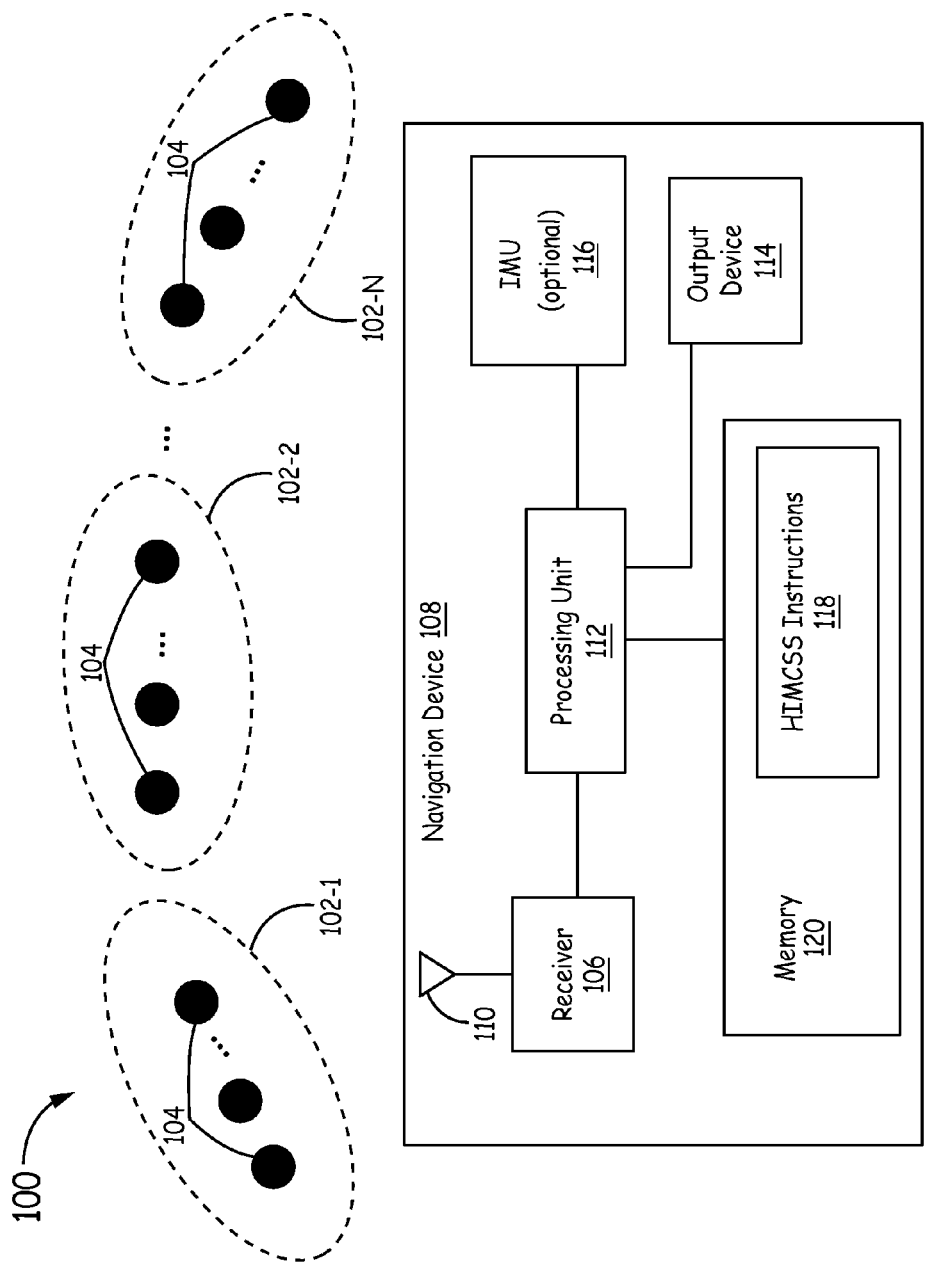
FIG. 1 is a high level block diagram of one embodiment of an exemplary navigation system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a high level block diagram of one embodiment of an exemplary general navigation system 100. The navigation system 100 includes a plurality of Global Navigation Satellite System (GNSS) constellations 102-1 . . . 102-N, where N is the total number of GNSS constellations. The specific GNSS constellations used and the number of GNSS constellations used vary based on the specific implementation. For example, although three GNSS constellations 102 are shown in FIG. 1, it is to be understood that in other embodiments two GNSS constellations or more than three GNSS constellations can be used. Exemplary satellite navigation systems include, but are not limited to, the Global Positioning System (GPS) developed by the United States of America, the Galileo system being developed by the European Union, the GLObalnaya NAvigatsionnaya Sputnikovaya Sistema (GLONASS) developed by the Russian Federation, and the Compass system being developed by China. Exemplary systems might also include local NSS such as the Indian Regional Navigation Satellite System (IRNSS) or other GNSS.

Each GNSS constellation 102 includes a plurality of space-based satellites 104 which transmit signals to a receiver 106 in a navigation device 108. As used herein, the term "constellation" refers to the group of space-based satellites 104 pertaining to a particular navigation system that are visible to the navigation device 108 (i.e. have a direct line of sight from the respective satellite 104 to the receiver 106). Thus, the number of satellites 104 in a given constellation may not include all of the satellites pertaining to the respective navigation system. For example, GPS includes at least 24 space-based satellites. However, at any given moment in time, less than 24 satellites may be visible to communicate with the navigation device 108. In addition, it is to be understood that the number of satellites 104 in each respective constellation 102 can be different from the number of satellites in another constellation 102. Furthermore, it is to be understood that although the satellites 104 are depicted in FIG. 1 as being grouped according to the respective GNSS constellation 102 for purposes of explanation, the satellites 104 are physically dispersed in space and not grouped together based on physical location. Additionally, all visible satellites independently of the origin constellation can be integrated in one group in some embodiments.

Each space-based satellite 104 transmits signals to the receiver 106 in the navigation device 108 according to the specific configuration of the respective GNSS technology. For example, GPS signals are transmitted at a different frequency than GLONASS signals. The receiver 108 includes one or more antennae 110 to receive the signals from the plurality of constellations 102. The signals are often referred to as pseudorange measurements which are used by the processing unit 112 in the navigation device 108 to calculate a position solution for the navigation device 108 using techniques known by one of skill in the art.

At times, a failure may occur in one or more of satellites 104 in one or more constellations 102. That is, a failed satellite may transmit corrupted or faulty signals or the transmitted signals may become corrupted due to unmodeled noise or other external factors. Such faulty pseudorange measurements can unpredictably degrade the accuracy (and thus affect the integrity) of the position solution calculated by the processing unit 112. Indeed, in extreme cases one or more entire GNSS constellations 102 could fail. The navigation device 108 is configured to monitor the integrity of the navigation solution and to process signals from the plurality of constellations 102 in order to meet demands of high integrity systems such as the attitude and heading reference system (AHRS) for certain classes of aircraft. In particular, the navigation device 108 implements a dual layer approach to segment navigation solutions based on the received signals into a corresponding domain for integrity monitoring.

As used herein a "domain" refers to a grouping of sub-solutions, or sub-sets of signals on which the sub-solutions are based, according to a shared characteristic which defines the domain. Also as used herein, a sub-solution is a solution based on less than all of the received signals. In contrast, a full-solution is a solution based on all of the received signals. A sub-sub-solution is a solution related to a corresponding sub-solution, but based on less than the total number of signals used to calculate the corresponding sub-solution. Additionally, a constellation full-solution is a sub-solution based only on all of the signals of the corresponding constellation. Similarly, a domain full-solution is a sub-solution based only on all of the signals in the corresponding domain. Thus, as used herein, the term 'satellite domain sub-solution' refers to those sub-solutions which are derived from the full-solution (i.e. processing all the available measurements) by excluding one or more satellite measurements. In some embodiments, the satellite domain sub-solution is "local". That is, in the satellite domain sub-solution, all processed measurements by the sub-solution are from a single constellation. Additionally, in some embodiments, the satellite domain sub-solution is "global," where the sub-solutions are based on selected sub-sets of all available pseudorange measurements (independently of the constellation to which they belong). Additionally, as used herein, a constellation domain sub-solution refers to those sub-solutions which are derived from the full-solution by excluding all satellites of one or more constellation(s). Embodiments of the sub-solution construction are discussed in more detail below.

The processing unit 112 is configured to separate sub-sets of the received signals into two different domains for calculation of corresponding navigation sub-solutions. Based on the sub-solutions in the two domains and, in some embodiments, on the full-solution, the processing unit 112 determines if there is satellite(s) failure in the navigation system, e.g. a failed satellite 104, etc. Different embodiments for the separation of sub-solutions (or sub-sets of signals on which the sub-solutions are based) into domains and for the determination of failure are described in more detail below with respect to FIGS. 2-8. The processing unit also provides protection levels (PLs) of the monitored quantities.

After identifying an error in the navigation system 100, the navigation device 108 outputs a signal to an output device 114 in order to communicate the identified error to a user, such as a pilot of an aircraft, via visual and/or aural cues. Thus, the output device 114 can be implemented using any suitable technology to communicate with a user, such as, but not limited to, a display unit, speakers, status lights, etc. In addition, in some embodiments the processing unit 112 is able to isolate or identify the specific space-based satellite 104 which is faulty. Furthermore, in some embodiments, the processing unit 112 receives signals from a sufficient number of satellites to exclude the identified faulty space-based satellite 104. Additionally, if a sufficient number of constellations 102 are used, the processing unit 112 is able to isolate and exclude the faulty constellation. Thus, in such embodiments, the processing unit 112 is able to continue calculating a navigation solution with sufficient integrity by excluding signals from the identified faulty space-based satellite 104 or faulty constellations 102. For example, if three constellations 102 are used, then fault detection and isolation (FDI) as well as fault detection and exclusion (FDE) are available for a single constellation failure. In some embodiments with three constellations 102, FDI is also available for dual constellation failure. In some embodiments, if four constellations 102 are used, then the FDI and FDE are available for dual constellations failure and FDI is available for failure of three constellations.

In addition, in the embodiment shown in FIG. 1, the navigation device 108 includes an optional Inertial Measurement Unit (IMU) 116 which measures inertial movement of the navigation device 108 or vehicle in which the navigation device 108 is located, as known to one of skill in the art. In some such embodiments, the IMU 116 is ultra-tightly coupled with the GNSS receiver 106. That is, the processing unit 112 uses measurements from both the IMU 116 and the GNSS receiver 106 to calculate a navigation solution that is used in the tracking loops of the GNSS receiver 106 for each respective GNSS constellation 102. However, rather than using a full navigation solution based on the measurements from all of the constellations 102, the processing unit 112 uses a navigation solution based on the respective constellation full-solution and IMU measurements for the tracking loop in receiver 106 for the respective constellation 102. Optionally, other measurement sources might be used with the navigation system (e.g., altimeter, magnetometer).

The processing unit 112 includes or functions with software programs, firmware or other computer readable instructions for carrying out various methods, process tasks, calculations, and control functions, used in the integrity monitoring described herein. These instructions are typically stored on any appropriate computer readable medium used for storage of computer readable instructions or data structures. For example, in the embodiment of FIG. 1, High-Integrity Multi-Constellation Solution Separation (HIMCSS) instructions 118 are stored on memory 120 and executed by processing unit 112.

The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAM-BUS Dynamic RAM (RDRAM), Static RAM (SRAM), etc.), Read Only Memory (ROM), Electrically Erasable Programmable ROM (EEPROM), and flash memory, etc.

During operation, receiver 106 receives satellite signals such as GNSS signals, extracts the satellite position and time data from the signals, and provides pseudorange measurements to processing unit 112. From the pseudorange measurements and the optional inertial or other measurements, the processing unit 112 derives a position, and optionally velocity, and attitude solution, such as by using a Kalman filter. The processing unit 112 can also use the pseudorange measurements to detect satellite transmitter failures and to determine a worst-case error, or protection level. In particular, a horizontal protection level (HPL) for position, a vertical protection level (VPL) for position, a horizontal protection level for velocity (VHPL), a vertical protection level for velocity (VVPL), and/or protection levels for roll, pitch, and yaw (heading) angles (RPL, PPL, YPL, respectively) can be computed. The HPL is the radius of a circle in the horizontal plane which describes the region that is assured to contain the indicated horizontal position. The HPL is a horizontal region for which predetermined missed alert and false alert requirements are met. The HPL is a function of the satellite and user geometry and the expected error characteristics. Thus, it is not affected by actual measurements.

With respect to aircraft, depending on the phase of flight, the VPL, VHPL, VVPL, and attitude and heading PLs (i.e., RPL, PPL, and YPL) may also be computed. PL computation is outlined below. For the integrity to be considered available for a particular phase of flight, the protection level should be less than the alert limit specified for that phase of flight. If the protection level exceeds the allowed alert limit, the navigation system is not able to provide the desired integrity. The processing unit 112 can compare the horizontal and/or vertical protection levels to an alarm limit corresponding to a particular aircraft flight phase, in some embodiments. In other embodiments, the processing unit 112 outputs the protection levels to another system such as a flight management system for further analysis.

The HIMCSS methods described herein are based on statistical tests of the estimates provided by the full-solution (processing all available GNSS measurements) and all sub-solutions (processing a subset of the measurements selected according to the specified GNSS fault states to be mitigated). In fact, the HIMCSS can be understood as an extension of the Solution Separation integrity monitoring method. The estimate of the navigation information provided by the full-solution is in the form of the expected value and covariance matrix usually denoted as (omitting time indices)

$$\hat{x}_0, P_0, \qquad \text{Eq. 1}$$

The navigation information estimate provided by the n-th sub-solution is also in the form of the mean and covariance matrix denoted as $$\hat{x}_n, P_n, n=1, 2, \ldots, M, \qquad \text{Eq. 2}$$

where M is total number of the specified GNSS fault states and, thus, the number of the sub-solutions. For example, if a single satellite failure is to be mitigated with a single constellation, then the number of sub-solutions M is equal to the number of available pseudorange measurements.

The structure of the navigation information is related to the type of the navigation system. Navigation systems processing the GNSS pseudorange measurements only provide the navigation information in the form of the receiver (or a navigation system) position and velocity. On the other hand, in some embodiments, integrated navigation systems processing measurements from several sensors (e.g., GNSS, inertial measurement unit, altimeter, etc.) provide the navigation information in the form of the position, velocity, and attitude and heading.

In some embodiments, a protection level (e.g. the HPL, VPL, VHPL, VVPL, RPL, PPL, or the YPL) is computed according to the following relation $$PL = \max_n \{PL_n\} = \max_n \{a_n + D_n\} \qquad \text{Eq. 3}$$

where $PL_n = a_n + D_n$ is the protection level of the n-th sub-solution. The "$D_n$-term" is the decision threshold computed on the basis of the allocated probability of false alert ($P_{FA}$) and the separation covariance matrix which can be computed as $$dP_n = P_n - P_0. \qquad \text{Eq. 4}$$

In some embodiments, a contribution of unmodeled biases in the pseudorange measurements is also considered in $D_n$-term computation. The "$a_n$-term", the integrity buffer, is computed on the basis of the sub-solution covariance matrix $P_n$ and allocated probability of missed detection ($P_{MD}$) which is derived from the integrity requirement often specified in terms of the allowed probability of hazardous misleading information ($P_{HMI}$). Analogously, the contribution of unmodeled bias can be taken into account as well. An alert notifying the user (or pilot) about the possible navigation information integrity violation is raised if any test statistic $d_n = \hat{x}_0 - \hat{x}_n$, $\forall n$, or its function exceeds the decision threshold given by the respective $D_n$-term.

As can be seen, the computed protection levels are functions of at least the full- and sub-solutions outputs, probabilities of false alert and missed detection (and a function for their allocation among the sub-solutions). Hence, specification of the GNSS fault states, as described herein, enables achieving a desired overall integrity of the navigation information. Additionally, the GNSS fault states, subsequently, determine the specification of the sub-solutions.

In the following text, exemplary embodiments of three architectures (centralized, hierarchical, and weighted) of the HIMCSS which allow reaching high-integrity navigation information are described in detail. Each of the architectures leverages the fact that multiple GNSS constellations are independently developed and maintained to achieve integrity levels which meet the requirements for high integrity or safety critical systems. The system and methods described herein can be implemented in the position, velocity, and/or attitude and heading domain depending on the used navigation system and user-defined requirements. Depending on the particular navigation system and processed sensors, a physical meaning is assigned to the estimates $\hat{x}_0$, $P_0$, $\hat{x}_n$, $P_n$ (e.g., the statistics representing the mean and covariance matrix of the position estimate provided by the full-solution and n-th sub-solution). Then, the one or more respective protection levels (PLs) are computed.

The exemplary architectures described herein are part of the navigation device 108 which is able to assure integrity levels sufficient for high integrity systems. For example, in terms of the probability of hazardous misleading information, $P_{HMI}$, occurring, the navigation device 108 is able to assure a $P_{HMI}$ of at least $1e^{-9}$ in some embodiments.

FIGS. 2-8 depict exemplary architectures for separating sub-solutions into domains. In particular, FIGS. 2-8 depict exemplary solution separations performed by a processing unit, such as the processing unit 112 in navigation device 108.

Centralized Architecture of HIMCSS

Figure 2:
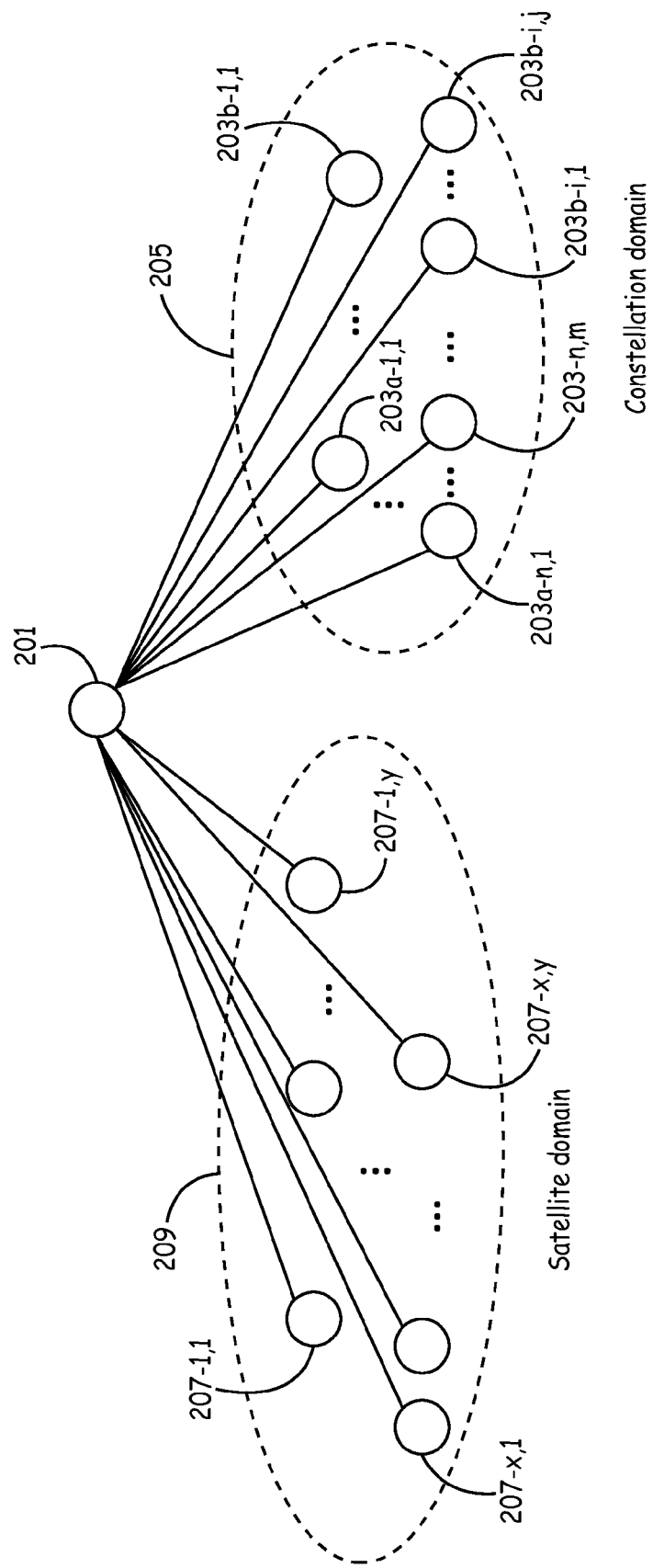
FIGS. 2-8 depict embodiments of exemplary architectures for high integrity multi-constellation solution separation with illustration of sub-solutions definition within two domains.

The general structure of the centralized architecture is illustrated in FIG. 2. The architecture includes constellation-based sub-solutions 203a-1,1 . . . 203b-i,j in a first domain 205. The sub-solutions in domain 205 are defined by subsets of each respective constellation. In addition, the architecture shown in FIG. 2 includes satellite-domain sub-solutions 207-1,1 . . . 207-x,y in domain 209 that are defined by subsets of all available satellites. In the centralized architecture, all the sub-solutions in each domain 205 and 209 are at the same level. That is, each of the sub-solution outputs are referred to the full-solution output 201. In other words, all the sub-solution outputs are evaluated with respect to the one full-solution 201 processing all the available measurements.

The centralized architecture can be further divided into full centralized architecture and reduced centralized architecture. The full centralized architecture is based on the satellite-domain sub-solutions which are selected from the set of all available satellites irrespectivelly of the constellation they come from. The reduced centralized architecture is, on the other hand, formed by satellite sub-solutions where the respective processed pseudorange measurements belong to the satellites within one constellation only.

Figure 3:
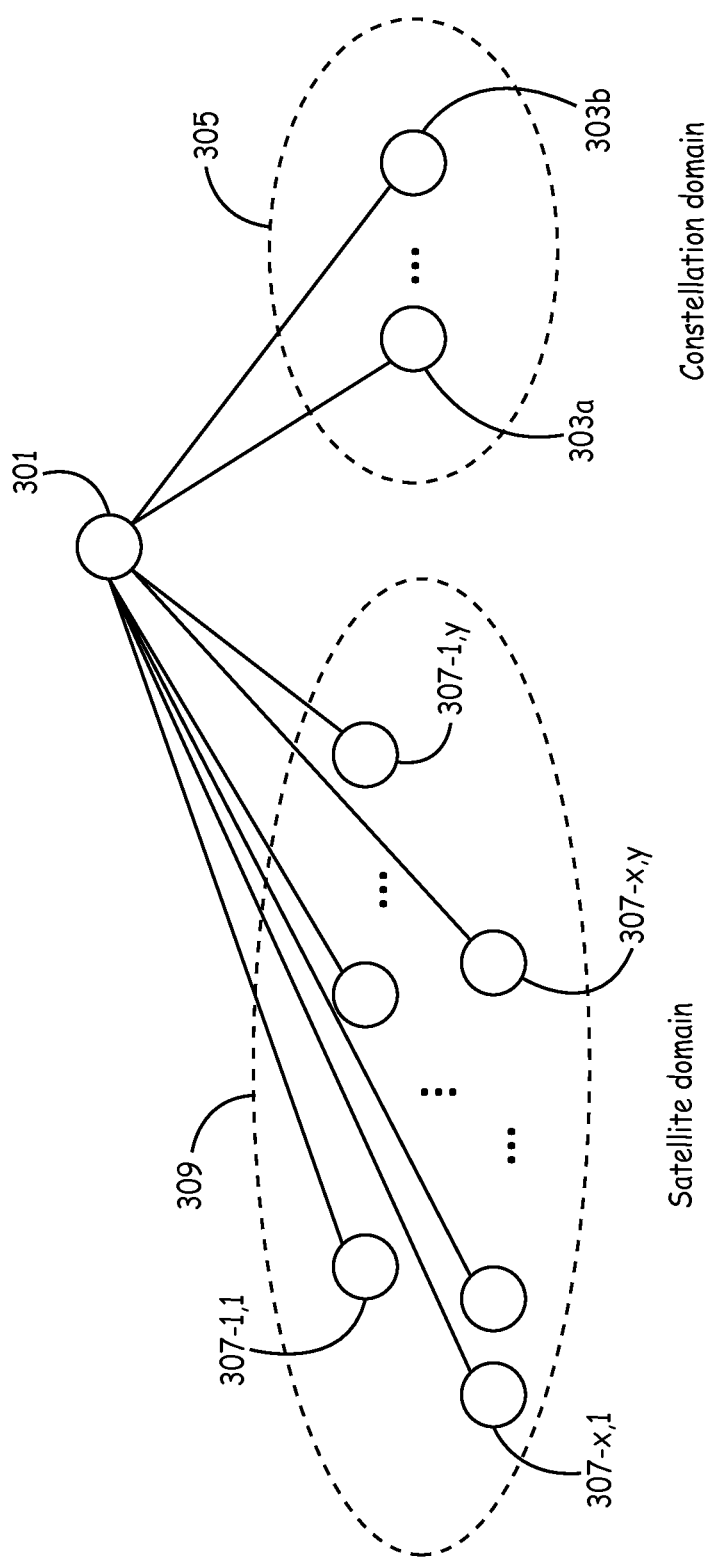

An exemplary full centralized architecture 300 for two constellations, e.g., GPS and Galileo, is illustrated in FIG. 3. The domain 305 contains two constellation-based sub-solutions 303a and 303b. One of the sub-solutions processes measurements from all visible satellites in a first constellation (e.g. NGPS measurements, where N is the total number) and the other from all visible satellites in another constellation (e.g. N Galileo measurements, NGAL). The satellite sub-solutions 307 in domain 309 are selected from the set of all measurements from both constellations (e.g. NGPS+NGAL).

If a single satellite failure is to be mitigated, then each satellite-domain sub-solution 307 is formed by different sets of NGPS+NGAL−1 pseudorange measurements (307-1,1- 307-1,y). Thus, there are NGPS+NGAL subset sub-solutions 307 in total. If a dual satellite failure is to be mitigated in addition, then satellite-domain sub-solutions 307 are formed by different sets of all combinations of all but two satellite measurements.

Figure 4:
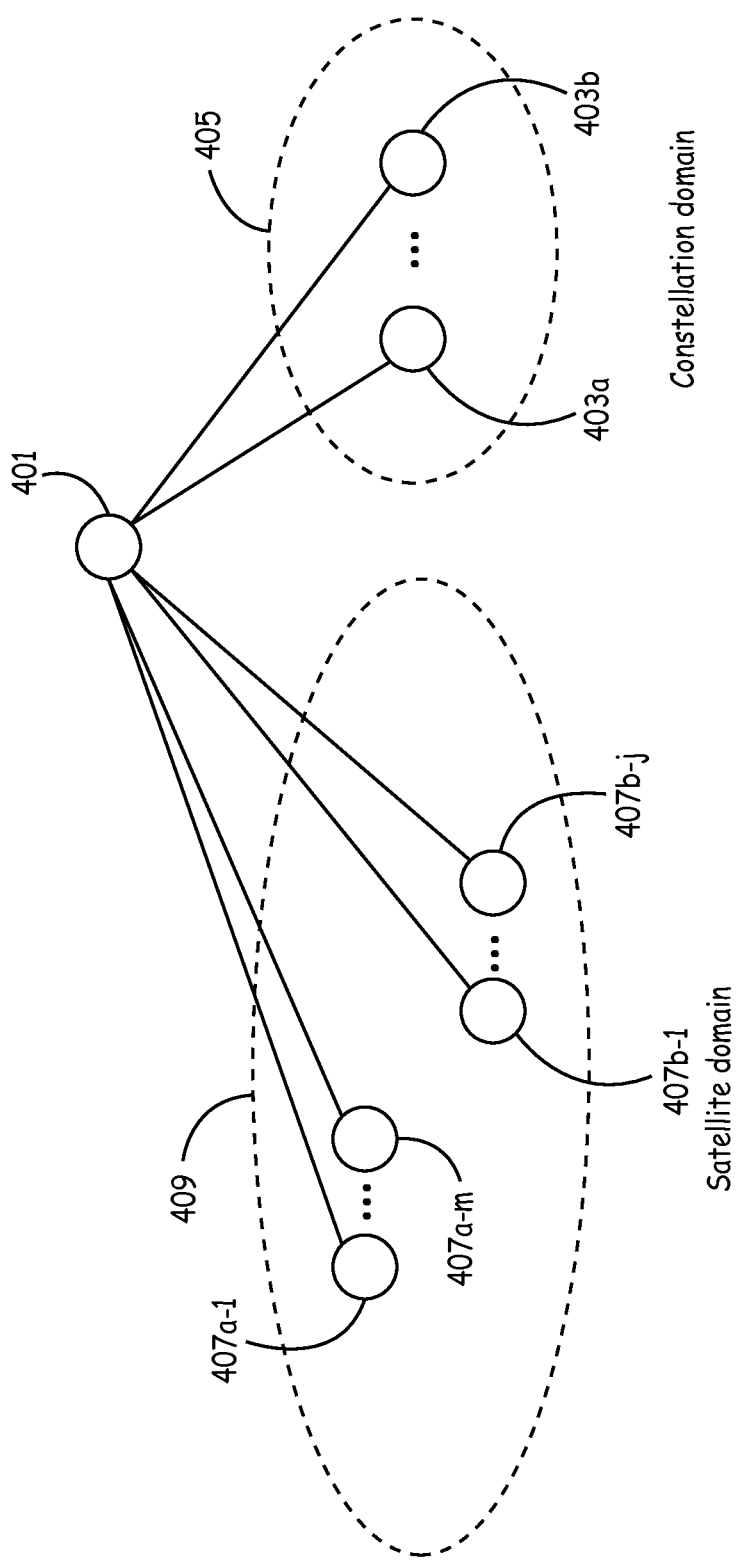

An exemplary reduced centralized architecture 400 for two constellations is illustrated in FIG. 4. The domain 405 contains two constellation-domain sub-solutions 403a and 403b. One of the sub-solutions processes measurements from all visible satellites in a first constellation (e.g. GPS measurements) and the other from all visible satellites in another constellation (e.g. Galileo). Each of the satellite-domain sub-solutions 407 in group or domain 409 are selected from either a sub-set of all measurements from a first constellation or from a sub-set of all measurements from the second constellation. Thus, if a single satellite failure is to be mitigated, then each satellite sub-solution 407 is formed by different sub-sets of N−1 pseudorange measurements (407a-1 . . . 407a-m) selected from all measurements of the first constellation or by different sub-sets of N−1 pseudorange measurements (407b-1 . . . 407b-j) selected from all measurements of the second constellation. Thus, in embodiments utilizing GPS and Galileo, there are NGPS+NGAL subset sub-solutions 407 in total, where NGPS is the total number of GPS measurements and NGAL is the total number of Galileo measurements. However, each sub-solution 407 processes less measurements than in the case of the full centralized architecture discusses in FIG. 3. If two simultaneous satellite failures from both constellations are to be mitigated then the respective satellite-domain sub-solutions 407 is formed by different sub-sets of N−2 pseudorange measurements selected from all measurements from either the first constellation or the second constellation. Since the satellite domain sub-solutions are constructed from a single constellation, the two simultaneous failures within the other constellation are mitigated inherently.

A processing unit, such as processing unit 112 then compares the difference between the full-solution 301, 401 and all constellation sub-solutions 303, 403 and the difference between the full-solution 301, 401 and the satellite sub-solutions 307, 407 with a pre-determined threshold. As stated above, the threshold can be selected based on statistical analysis, such as an acceptable standard deviation, probability of False Alert (PFA), probability of Missed Detection (PMD), biases, etc. If the difference exceeds the threshold, the processing unit determines that an error or fault has occurred. Through the comparison of the full-solution with each respective satellite sub-solution, the processing unit is able to identify if one or more satellites have failed. Thus, through the use of the solution separation principle, the architectures shown in FIGS. 2-4 mitigate failure of one or more constellations as well as failure of one or more satellites in one or more constellations without complete failure of a constellation.

With respect to the architecture of FIG. 2, the protection level (PL) is defined as:

$$PL = \max\{a_j + D_j\}, j=1, 2, \ldots, M \qquad \text{Eq.}$$

The '$D_j$' term is the decision threshold related to the probability of false detection. The '$a_j$' term is the error bound related to the probability of a missed detection (often called integrity buffer), and M is the total number of sub-solutions. The protection levels are computed according to the standard relations known from the solution separation, i.e., outputs of all sub-solutions (either constellation or subset) are statistically compared with the full-solution output.

Referring to FIG. 4, another exemplary embodiment of a reduced centralized architecture for two constellations can be configured by complete omitting of the constellation domain sub-solutions 405. Since the satellite domain sub-solutions are constructed from a single constellation, the wide failure of the other constellation is mitigated inherently.

Hierarchical Architecture of HIMCSS

Figure 5:
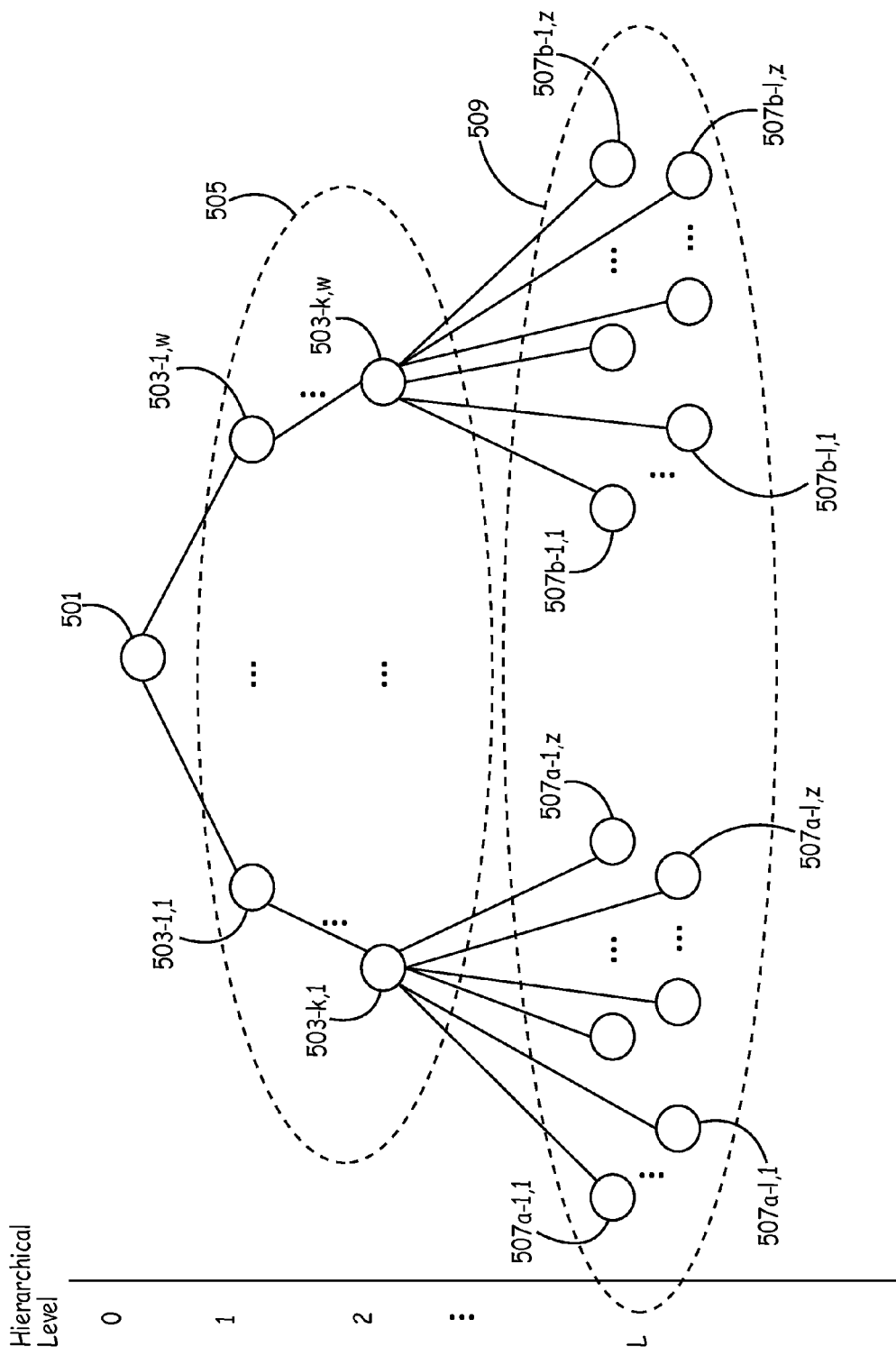
Figure 6:
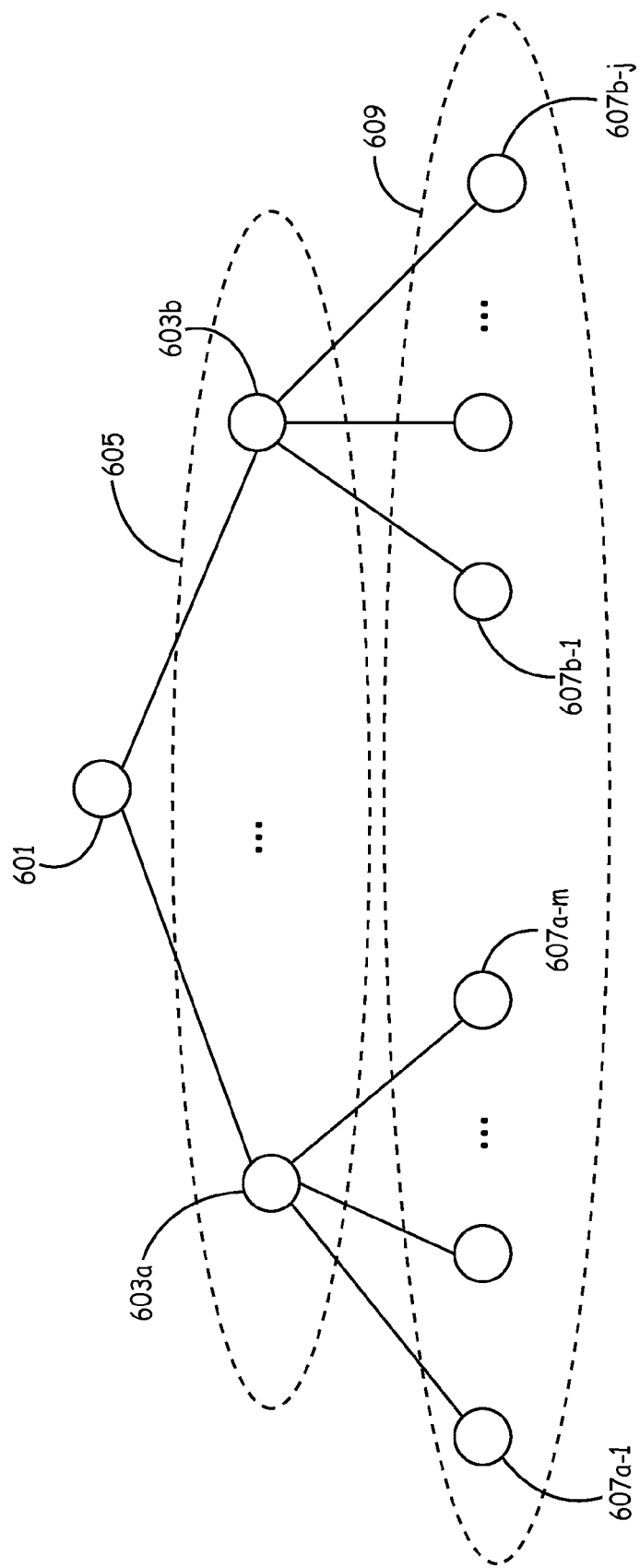

FIGS. 5-6 describe exemplary embodiments of the Hierarchical architecture of HIMCSS. In the Hierarchical architecture, sub-solutions output at a given level (k) are compared with respect to a sub-solution output at a previous level (k−1) where k=0, 1, 2 . . . L. An exemplary Hierarchical architecture is depicted in FIG. 5 where the group or domain 505 contains constellation-domain sub-solutions 503 and the group or domain 509 contains satellite-domain sub-solutions 507 defined analogously to the reduced centralized architecture.

The specific example of the hierarchical architecture shown in FIG. 6 is for two constellations (e.g., GPS and Galileo). The full-solution 601 processes all available measurements from both constellations. In the group 605, two constellation sub-solutions 603a and 603b and in the group 609, two sets of satellite-domain sub-solutions 607a-1 . . . 607a-m and 607b-1 . . . 607b-j are considered. Sub-solutions 607a-1-607a-m process all but one or more measurements related to the first constellation and sub-solutions 607b-1 . . . 607b-j process all but one or more measurements related to the second constellation.

Then, the output of two constellation sub-solutions 603a and 603b in domain 605 are statistically compared with the full-solution output 601 and the outputs of the satellite sub-solutions 607 are statistically compared with the output of the respective constellation sub-solutions 603.

Thus, due to the hierarchical structure, the computation of protection levels is defined differently than with the centralized structures of FIGS. 2-4. In particular, the protection levels (for all considered quantities, e.g., for the horizontal and vertical position and velocity and for the attitude and heading) are computed as follows:

$$PL = \max_j \{a_j + D_{i,j} + D_{i,0}\}, j=1, 2, \ldots N; i=1, \ldots, m, \quad m=2 \quad \text{Eq. 5}$$

In Eq. 5, the '$a_j$' term is related to the probability of missed detection and the covariance matrix of the j-th satellite sub-solution 507. The '$D_{i,j}$' term related to the probability of false detection and the separation covariance matrix of the j-th satellite sub-solution 507 and the corresponding i-th constellation sub-solution 503. The '$D_{i,0}$' term is related to the probability of false detection and the separation covariance matrix of the i-th constellation sub-solution 503 and the full-solution 501.

Weighted Architecture of HIMCSS

Figure 7:
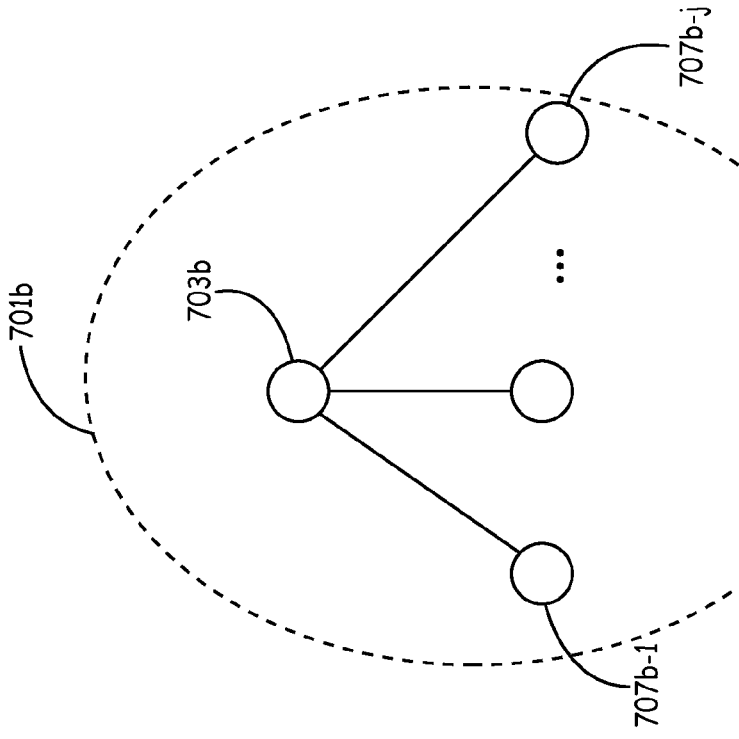
Figure 7:
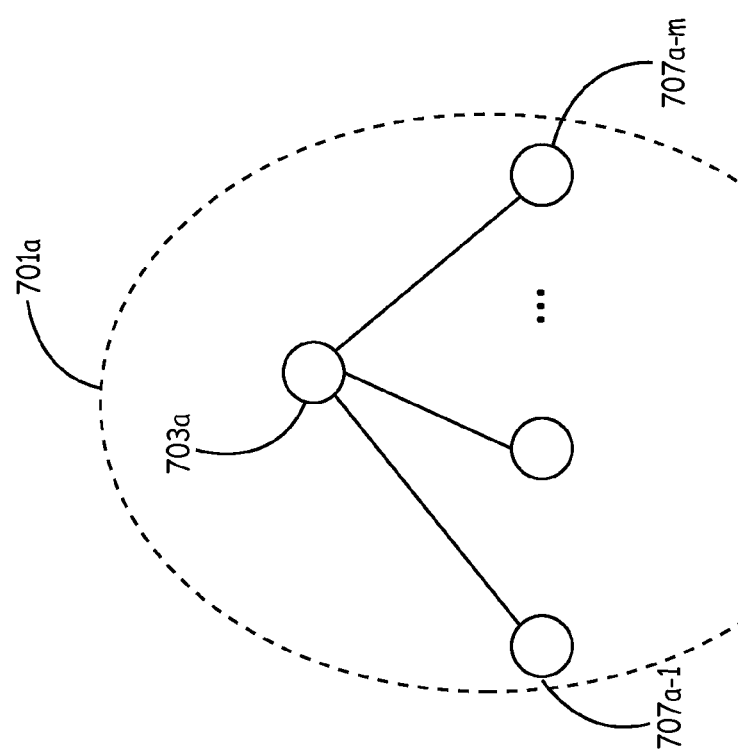

The weighted architecture is based on the independent integrity monitoring of several independent constellations. For purposes of explanation, only two independent constellations, e.g. GPS and Galileo, are shown in FIG. 7. However, it is to be understood that more than two independent constellations can be used in other embodiments. Each constellation is independently monitored for the integrity of the provided navigation information. This fact is illustrated in FIG. 7 where domain 701a illustrates the integrity monitoring of the navigation information provided on the basis of the first constellation related measurements and, similarly, 701b the integrity monitoring for the second constellation. Thus, 703a is the full-solution of the first constellation and 707a-1 . . . 707a-m are sub-solutions within the first constellation. Similarly, 703b is the full-solution of the second constellation and 707b-1-707b-j are sub-solutions within the second constellation.

Figure 8:
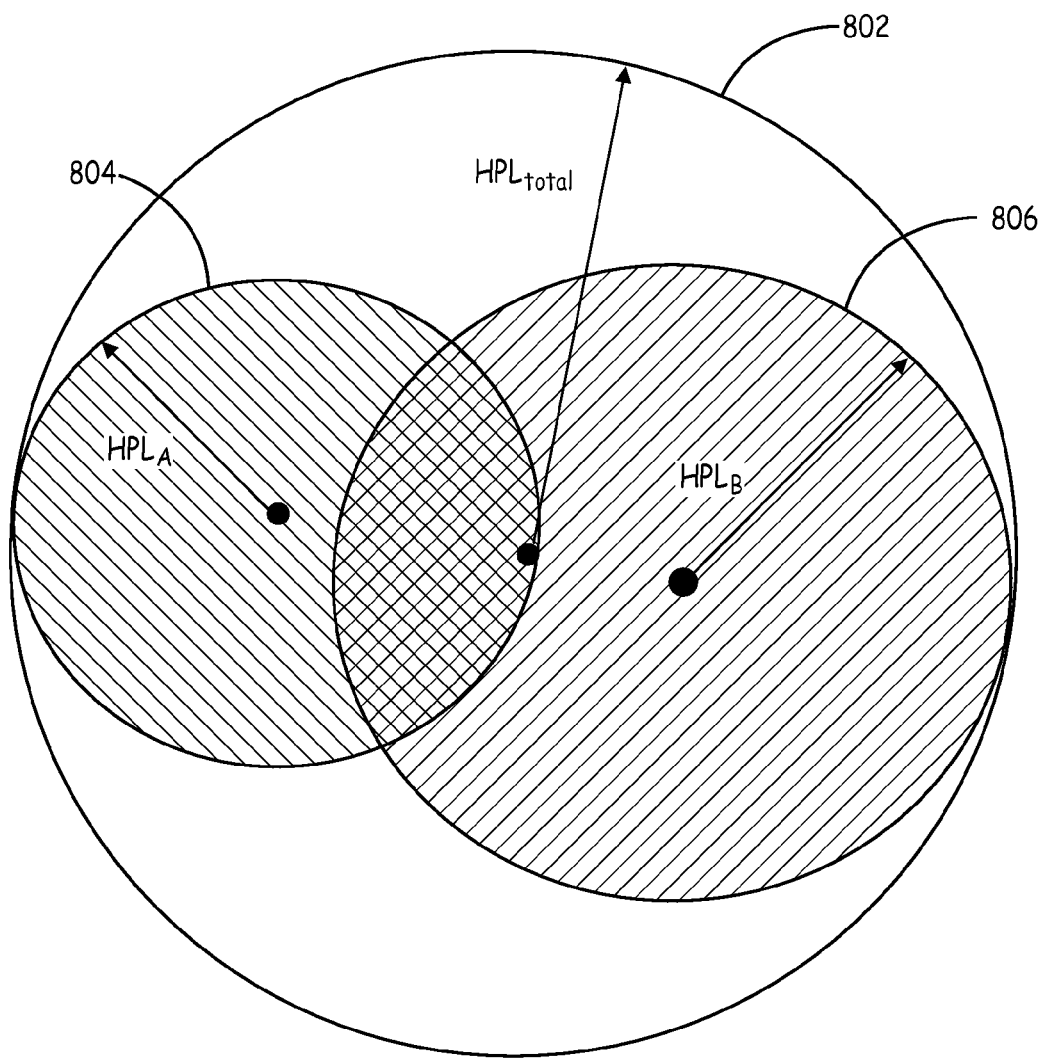

The outputs of the integrity monitoring method for both constellations are subsequently fused together as illustrated in FIG. 8 for the horizontal protection level. In FIG. 8, the computed HPL for the first constellation is denoted as $HPL_A$ 804 and the computed HPL for the second constellation as $HPL_B$ 806. The $HPL_A$ is provided with the probability of hazardous misleading information $P_{HMIA}$ and $HPL_B$ with $P_{HMIB}$. Then, their exemplary combination results in the total horizontal protection level $HPL_{total}$ 802 (which is larger than both respective $HPL_A$ and $HPL_B$) with the overall probability of misleading information $$P_{HMItotal} \leq P_{HMIA} \times P_{HMIB}$$

If more independent constellations are available or other protection levels are computed in other embodiments, the procedure of a total protection level computation (with the overall integrity $P_{HMItotal}$) is analogous to that described above. For example, in some embodiments three or more constellations are used. Also, it should be noted that the particular budgets $P_{HMIA}$ and $P_{HMIB}$ can be derived from the requirement on the total HMI budget, i.e., $P_{HMItotal}$. In other words, the particular budgets and $P_{HMIB}$ can be calculated to get the lowest overall protection level with the required total HMI budget.

The weighted architecture can be viewed as a special case of the hierarchical architecture where the full-solution is not computed. A processing unit, thus, uses the computed total HPL 802 to detect faults. The weighted architecture is based on the particular protection levels only. It does not rely on any pseudorange measurements. However, the weighted architecture, unlike the centralized and hierarchical architectures, does not directly allow detection of a constellation failure or its subsequent isolation.

Figure 9:
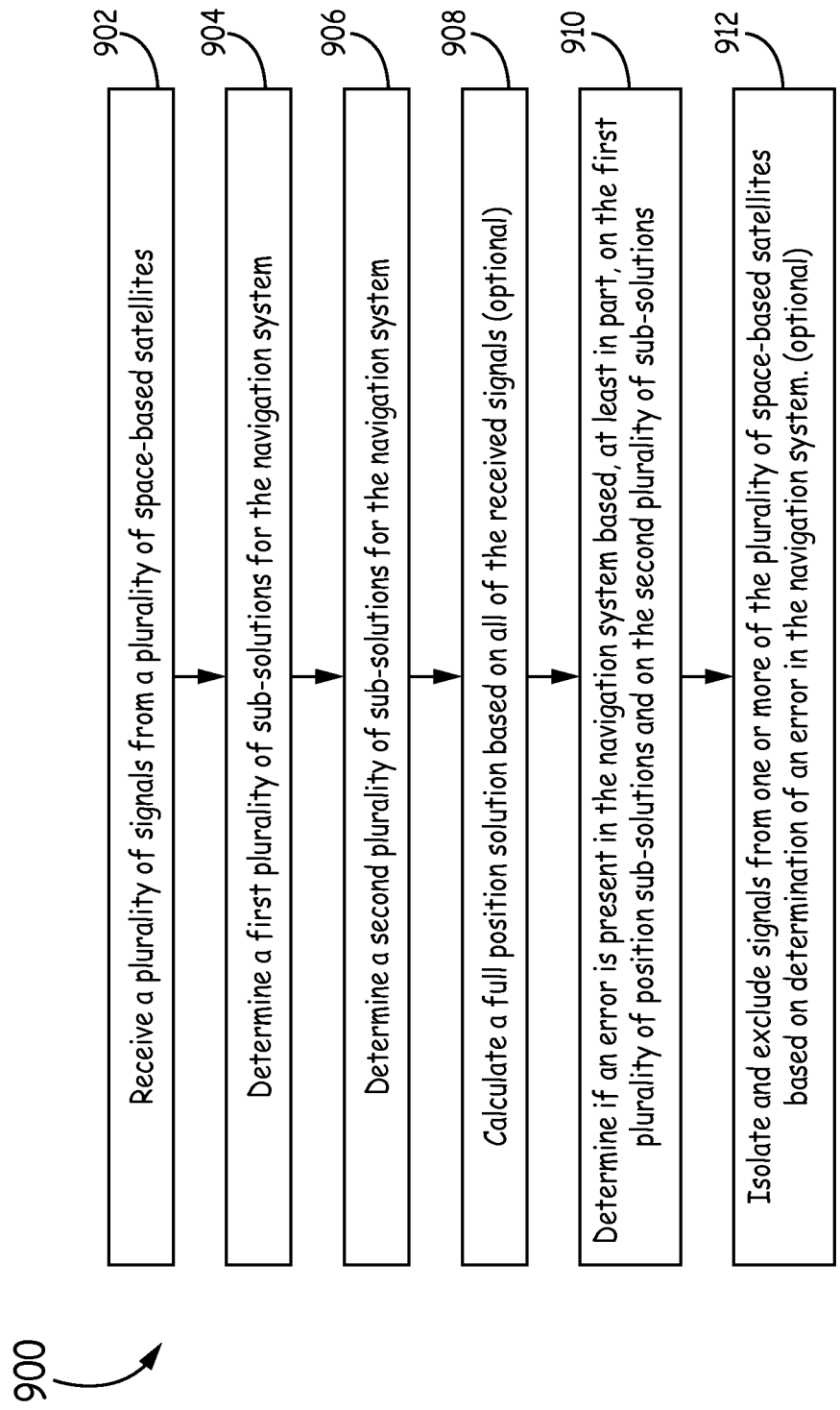
FIG. 9 is a flow chart depicting one embodiment of an exemplary method of integrity monitoring of navigation information in a navigation system.

FIG. 9 is a flow chart depicting an exemplary method 900 of integrity monitoring for errors in a navigation satellite system. Method 900 can be implemented in a navigation device such as navigation device 108 in system 100 described above. At block 902, a plurality of signals is received at a receiver of the navigation device. Each signal is transmitted from a respective one of a plurality of space-based satellites and the plurality of space-based satellites comprises at least one space-based satellite from each of a plurality of GNSS constellations. For example, signals can be received from space-based satellites in two or more of a GPS constellation, a Galileo constellation, a GLONASS constellation, and a Compass constellation.

At block 904, a first plurality of sub-solutions for the navigation system are determined or calculated in a first domain, such as with a processing unit as described above. Each sub-solution in the first plurality of sub-solutions is determined based on a respective sub-set of the plurality of signals. Each respective sub-set in the first domain is chosen according to a characteristic defining the first domain. For example, in some embodiments, each respective sub-set in the first domain comprises only signals from space-based satellites in a constellation corresponding to the respective sub-set.

At block 906, a second plurality of sub-solutions for the navigation system are determined or calculated in a second domain. Each sub-solution in the second plurality of sub-solutions is determined based on a respective sub-set of the plurality of signals. Each respective sub-set in the second domain is chosen according to a characteristic defining the second domain. For example, in some embodiments, each respective sub-set in the second domain comprises signals from all of the plurality of space-based satellites except at least one space-based satellite corresponding to the respective sub-set. In other embodiments, each respective sub-set in the second domain corresponds to a respective constellation and comprises signals from all but one or more of the space-based satellites that correspond to the respective constellation.

At block 908, a full-solution based on all of the received signals is optionally calculated. At block 910, a processing unit determines if an error is present in the navigation satellite system based, at least in part, on the first plurality of sub-solutions in the first domain and on the second plurality of sub-solutions in the second domain. For example, in some embodiments, determining if an error is present comprises determining if an error is present in the navigation system based on a comparison of the first plurality of sub-solutions with the full-solution and on a comparison of the full-solution with the second plurality of sub-solutions. In other embodiments, determining if an error is present comprises determining if an error is present based on a comparison of one or more sub-solutions in the first plurality of sub-solutions with the full-solution and on a comparison of each sub-solution in the second plurality of sub-solutions with a corresponding one of the first plurality of sub-solutions.

Additionally, in some embodiments, the processing unit determines if an error is present by determining a protection level for a first constellation based on the sub-solutions in the first plurality of sub-solutions and a protection level for a second constellation based on the sub-solutions in the second plurality of sub-solutions. The processing unit then combines the respective protection levels for the plurality of constellations to obtain a total protection level used to identify errors.

Thus, through the specification of possible GNSS fault states or error conditions via separation of sub-solutions into two or more distinct domains (e.g., satellite or constellation domain), the embodiments described herein enable mitigation of selected fault states and integrity levels suitable for high integrity or safety critical systems, as discussed above. In addition, the embodiments described herein inherently monitor the navigation information computed on the basis of a single constellation related measurements. Such a property can be exploited in design of an ultra-tightly coupled GNSS/INS navigation system with the integrity monitoring as discussed above.

EXAMPLE EMBODIMENTS

Example 1 includes a method of integrity monitoring for errors in a navigation system, the method comprising: receiving a plurality of signals, each signal transmitted from a respective one of a plurality of space-based satellites, wherein the plurality of space-based satellites comprises at least one space-based satellite from each of a plurality of Navigation Satellite System (NSS) constellations; determining, in a first domain, a first plurality of sub-solutions for the navigation system, wherein each sub-solution in the first plurality of sub-solutions is determined based on a respective sub-set of the plurality of signals, each respective sub-set in the first domain chosen according to a characteristic defining the first domain; determining, in a second domain, a second plurality of sub-solutions for the navigation system, wherein each sub-solution in the second plurality of sub-solutions is determined based on a respective sub-set of the plurality of signals, each respective sub-set in the second domain chosen according to a characteristic defining the second domain; and determining if an error is present in the navigation system based, at least in part, on the first plurality of sub-solutions in the first domain and on the second plurality of sub-solutions in the second domain.

Example 2 includes the method of Example 1, further comprising: determining a full-solution for the navigation system based on all of the plurality of signals; wherein each respective sub-set in the first domain comprises only signals from space-based satellites from all constellations except at least one constellation corresponding to the respective sub-set; wherein each respective sub-set in the second domain comprises signals from all of the plurality of space-based satellites except at least one space-based satellite corresponding to the respective sub-set; and wherein determining if an error is present comprises determining if an error is present in the navigation system based on a comparison of the first plurality of sub-solutions with the full-solution and on a comparison of the full-solution with the second plurality of sub-solutions; the method further comprising: determining a protection level for each sub-solution in the first plurality of sub-solutions and in the second plurality of sub-solutions; and selecting one of the determined protection levels as a total protection level.

Example 3 includes the method of Example 1, further comprising: determining a full-solution for the navigation system based on all of the plurality of signals; wherein each respective sub-set in the first domain comprises only signals from space-based satellites from all constellations except at least one constellation corresponding to the respective sub-set; wherein each respective sub-set in the second domain comprises signals from all of the plurality of space-based satellites except at least one space-based satellite corresponding to the respective sub-set; and wherein determining if an error is present comprises determining if an error is present in the navigation system based on a comparison of one or more sub-solution in the first plurality of sub-solutions with the full-solution and on a comparison of each sub-solution in the second plurality of sub-solutions with a corresponding one of the first plurality of sub-solutions; the method further comprising: determining a protection level for each sub-solution in the first plurality of sub-solutions and in the second plurality of sub-solutions; and combining one of the protection levels for the first plurality of sub-solutions with a corresponding protection level for the second plurality of sub-solutions.

Example 4 includes the method of Example 1, wherein a first constellation of the plurality of NSS constellations defines the first domain and a second constellation of the plurality of NSS constellations defines the second domain; wherein each respective sub-set in the first domain corresponds to the first constellation and comprises signals from all but one or more of the space-based satellites that correspond to the first constellation; wherein each respective sub-set in the second domain corresponds to the second constellation and comprises signals from all but one or more of the space-based satellites that correspond to the second constellation; wherein determining if an error is present in the navigation system comprises: determining if an error is present in the navigation system based on comparison of each sub-solution in the first plurality of sub-solutions with a first domain full-solution for the first domain; and determining if an error is present in the navigation system based on a comparison of each sub-solution in the second plurality of sub-solutions with a second domain full-solution for the second domain; the method further comprising determining a total protection level, wherein determining a total protection level comprises: determining a protection level for the first constellation based on the sub-solutions in the first plurality of sub-solutions; determining a protection level for the second constellation based on the sub-solutions in the second plurality of sub-solutions; and combining the respective protection levels for the first and second constellations to obtain the total protection level.

Example 5 includes the method of Example 4, wherein the plurality of NSS constellations further comprises a third constellation which defines a third domain comprising a third plurality of sub-solutions for the navigation system, each sub-solution in the third plurality of sub-solutions determined based on a respective sub-set of the plurality of signals; wherein each respective sub-set in the third domain corresponds to the third constellation and comprises signals from all but one or more of the space-based satellites that correspond to the third constellation; and wherein determining if an error is present in the navigation system further comprises determining if an error is present in the navigation system based on comparison of each sub-solution in the third plurality of sub-solutions with a third domain full-solution for the third domain; wherein determining the total protection level further comprises: determining a protection level for the third constellation based on the sub-solutions in the third plurality of sub-solutions; and combining the respective protection levels for the first, second, and third constellations to obtain the total protection level.

Example 6 includes the method of any of Examples 1-4, further comprising: isolating and excluding signals from one or more of the plurality of space-based satellites based on determination of an error in the navigation system.

Example 7 includes the method of any of Examples 1-6, wherein the plurality of NSS constellations comprises two or more of a Global Positioning System (GPS) constellation, a Galileo constellation, a GLObalnaya NAvigatsionnaya Sputnikovaya Sistema (GLONASS) constellation, and a Compass constellation.

Example 8 includes a navigation device comprising: a receiver configured to receive a plurality of signals transmitted from a plurality of space-based satellites in each of a plurality of Navigation Satellite System (NSS) constellations; and a processing unit operatively coupled to the receiver and configured to calculate a respective sub-solution for each of a first plurality of sub-sets of the plurality of signals in a first domain; wherein the processing unit is further configured to calculate a respective sub-solution for each of a second plurality of sub-sets of the plurality of signals in a second domain; and wherein the processing unit is further configured to identify an error in a navigation system based, at least in part, on the sub-solutions in the first domain and on the sub-solutions in the second domain.

Example 9 includes the navigation device of Example 8, wherein the processing unit is configured to calculate a full-solution for the navigation system based on all of the plurality of signals from all of the NSS constellations; wherein the processing unit is further configured to calculate each respective sub-solution in the first domain based only on signals from all NSS constellations except at least one NSS constellation corresponding to the respective sub-solution; wherein the processing unit is further configured to calculate each respective sub-solution in the second domain based on all of the plurality of signals from all of the plurality of NSS constellations except signals from at least one space-based satellite corresponding to the respective sub-solution; wherein the processing unit is further configured to identify an error in the navigation system based on a comparison of the full-solution with each respective sub-solution in the first domain and on a comparison of the full-solution with each respective sub-solution in the second domain; and wherein the processing unit is further configured to determine a protection level for each sub-solution in the first domain and for each sub-solution in the second domain, the processing unit further configured to select one of the determined protection levels as a total protection level.

Example 10 includes the navigation device of Example 8, wherein the processing unit is further configured to calculate a full-solution for the navigation system based on all of the plurality of signals from all of the NSS constellations; wherein the processing unit is configured to calculate each sub-solution in the first domain based on all of the received signals from the space-based satellites in all of the NSS constellations except at least one NSS constellation corresponding to the respective sub-solution; and wherein each respective sub-solution in the second domain corresponds to one of the NSS constellations and the processing unit is configured to calculate each respective sub-solution in the second domain based on signals from all but one or more of the space-based satellites in the NSS constellation that corresponds to the respective sub-solution; wherein the processing unit is configured to identify an error in the navigation system based on a comparison of one or more respective sub-solutions in the first domain with the full-solution and on a comparison of each respective sub-solution in the second domain with a corresponding sub-solution in the first domain; wherein the processing unit is further configured to determine a protection level for each sub-solution in the first plurality of sub-solutions and in the second plurality of sub-solutions and to combine one of the protection levels for the first plurality of sub-solutions with a corresponding protection level for the second plurality of sub-solutions.

Example 11 includes the navigation device of Example 8, wherein a first constellation of the plurality of NSS constellations defines the first domain and a second constellation of the plurality of NSS constellations defines the second domain; wherein the processing unit is configured to calculate each sub-solution in the first domain based on signals from all but one or more of the space-based satellites that correspond to the first constellation; wherein the processing unit is configured to calculate each sub-solution in the second domain based on signals from all but one or more of the space-based satellites that correspond to the second constellation; wherein processing unit is configured to determining if an error is present in the navigation system by comparing each sub-solution in the first domain with a first domain full-solution for the first domain and comparing each sub-solution in the second domain with a second domain full-solution for the second domain; wherein the processing unit is further configured to determine a total protection level by: determining a protection level for the first constellation based on the sub-solutions in the first domain; determining a protection level for the second constellation based on the sub-solutions in the second domain; and combining the respective protection levels for the first and second constellations to obtain the total protection level.

Example 12 includes the navigation device of any of Examples 8-11, further comprising an inertial measurement unit (IMU) configured to provide inertial measurements to the processing unit; wherein the processing unit is further configured to calculate a respective constellation full-solution for each NSS constellation based on the inertial measurements and on the signals from each respective NSS constellation; wherein the processing unit is further configured to use the respective constellation full-solutions in tracking loops of the receiver for the respective NSS constellations.

Example 13 includes the navigation device of any of Examples 8-12, wherein the processing unit is further configured to isolate and exclude signals from one or more of the plurality of space-based satellites based on an identified error in the navigation system.

Example 14 includes the navigation device of any of Examples 8-13, wherein the plurality of NSS constellations comprises two or more of a Global Positioning System (GPS) constellation, a Galileo constellation, a GLObalnaya NAvigatsionnaya Sputnikovaya Sistema (GLONASS) constellation, and a Compass constellation.

Example 15 includes a program product comprising a non-transitory processor-readable medium on which program instructions are embodied, wherein the program instructions are configured, when executed by at least one programmable processor, to cause the at least one programmable processor to: calculate a respective sub-solution in a first domain for each of a first plurality of sub-sets of signals received from a plurality of space-based satellites in each of a plurality of Navigation Satellite System (NSS) constellations; calculate a respective sub-solution in a second domain for each of a second plurality of sub-sets of the signals received from the plurality of space-based satellites; and identify an error in a navigation system based, at least in part, on the respective sub-solutions in the first domain and on the respective sub-solutions in the second domain.

Example 16 includes the program product of Example 15, wherein the program instructions are further configured to cause the at least one programmable processor to calculate a full-solution for the navigation system based on all of the plurality of signals from all of the NSS constellations; calculate each respective sub-solution in the first domain based only on signals from all NSS constellations except at least one NSS constellation corresponding to the respective sub-solution; calculate each respective sub-solution in the second domain based on all of the plurality of signals from all of the plurality of NSS constellations except signals from at least one space-based satellite corresponding to the respective sub-solution in the second domain; identify an error in the navigation system based on a comparison of the full-solution with each respective sub-solution in the first domain and on a comparison of the full-solution with each respective sub-solution in the second domain; determine a protection level for each sub-solution in the first domain and for each sub-solution in the second domain; and select one of the determined protection levels as a total protection level.

Example 17 includes the program product of Example 15, wherein the program instructions are further configured to cause the at least one programmable processor to calculate a full-solution for the navigation system based on all of the plurality of signals from all of the NSS constellations; calculate each sub-solution in the first domain based on all of the received signals from the space-based satellites in all of the NSS constellations except at least one NSS constellation corresponding to the respective sub-solution; calculate each respective sub-solution in the second domain based on signals from all but one or more of the space-based satellites in the NSS constellation that corresponds to the respective sub-solution in the second domain; identify the error in the navigation system based on a comparison of one or more respective sub-solutions in the first domain with the full-solution and a comparison of each respective sub-solution in the second domain with a corresponding sub-solution in the first domain; determine a protection level for each sub-solution in the first plurality of sub-solutions and in the second plurality of sub-solutions; and combine one of the protection levels for the first plurality of sub-solutions with a corresponding protection level for the second plurality of sub-solutions.

Example 18 includes the program product of Example 17, wherein a first constellation of the plurality of NSS constellations defines the first domain and a second constellation of the plurality of NSS constellations defines the second domain; wherein the program instructions are further configured to cause the at least one programmable processor to: calculate each sub-solution in the first domain based on signals from all but one or more of the space-based satellites that correspond to the first constellation; calculate each sub-solution in the second domain based on signals from all but one or more of the space-based satellites that correspond to the second constellation; determine if an error is present in the navigation system by comparing each sub-solution in the first domain with a first domain full-solution for the first domain and comparing each sub-solution in the second domain with a second domain full-solution for the second domain; determine a protection level for the first constellation based on the sub-solutions in the first domain; determine a protection level for the second constellation based on the sub-solutions in the second domain; and combine the respective protection levels for the first and second constellations to obtain a total protection level.

Example 19 includes the program product of any of Examples 15-18, wherein the program instructions are further configured to cause the at least one programmable processor to: calculate a respective constellation full-solution for each NSS constellation based on inertial measurements from an inertial measurement unit and on the signals from each respective NSS constellation; and output the respective constellation full-solutions for use in tracking loops of a receiver for the respective NSS constellations.

Example 20 includes the program product of any of Examples 15-19, wherein the program instructions are further configured to cause the at least one programmable processor to isolate and exclude signals from one or more of the plurality of space-based satellites based on an identified error in the navigation system.

Although specific embodiments have been illustrated and described herein, it will be appreciated by those of ordinary skill in the art that any arrangement, which is calculated to achieve the same purpose, may be substituted for the specific embodiments shown. For example, although only global navigation satellite systems (GNSS) have been discussed herein, it is to be understood that regional navigation satellite systems, such as the Indian Regional Navigation Satellite System (IRNSS), can also be used. Thus, the term Navigation Satellite System (NSS) includes both GNSS and regional navigation satellite systems. Therefore, it is manifestly intended that this invention be limited only by the claims and the equivalents thereof.

What is claimed is:

1. A method of integrity monitoring for errors in a navigation system, the method comprising:
  receiving a plurality of signals, each signal transmitted from a respective one of a plurality of space-based satellites, wherein the plurality of space-based satellites comprises at least one space-based satellite from each of a plurality of Navigation Satellite System (NSS) constellations;
  determining a plurality of first sub-solutions for the navigation system in a constellation domain, wherein each respective first sub-solution of the plurality of first sub-solutions in the constellation domain is determined from a first sub-set of signals received from space-based satellites from all constellations except at least one constellation that corresponds to the respective first sub-solution;
  determining a plurality of second sub-solutions for the navigation system in a satellite domain, wherein each respective second sub-solution of the plurality of second sub-solutions in the satellite domain is determined from a second sub-set of signals received from all of the plurality of space-based satellites except at least one space-based satellite that corresponds to the respective second sub-solution; and determining if an error is present in the navigation system based, at least in part, on the plurality of first sub-solutions in the constellation domain and on the plurality of second sub-solutions in the satellite domain.

2. The method of claim 1, further comprising:
determining a full-solution for the navigation system based on the received signals; and
wherein determining if an error is present comprises determining if an error is present in the navigation system based on a comparison of the plurality of first sub-solutions with the full-solution and on a comparison of the full-solution with the plurality of second sub-solutions;
the method further comprising:
determining a protection level for each sub-solution in the plurality of first sub-solutions and in the plurality of second sub-solutions; and
selecting one of the determined protection levels as a total protection level.

3. The method of claim 1, wherein the constellation domain is based on a plurality of NSS constellation signals and the satellite domain is based on a distinct plurality of satellites signals related to respective NSS constellations;
wherein each respective first sub-set of signals in the constellation domain comprises only signals from space-based satellites from all constellations except at least one constellation corresponding to the respective first sub-set of signals;
wherein space-based satellite signals from one constellation constitutes a full solution for the satellite domain;
wherein determining if an error is present in the navigation system comprises:
determining if an error is present in the navigation system based on a comparison of each first sub-solution in the plurality of first sub-solutions with a constellation domain full-solution for the constellation domain; and
determining if an error is present in the navigation system based on a comparison of each second sub-solution in the plurality of second sub-solutions with the the satellite domain full-solution;
the method further comprising determining a total protection level, wherein determining a total protection level comprises:
determining a protection level for each first sub-solution in the plurality of first sub-solutions;
determining a protection level for each second sub-solution in the plurality of second sub-solutions; and
combining the respective protection levels for the first and second sub-solutions to obtain the total protection level.

4. The method of claim 1, further comprising:
isolating and excluding signals from one or more of the plurality of space-based satellites based on determination of an error in the navigation system.

5. The method of claim 1, wherein the plurality of NSS constellations comprises two or more of a Global Positioning System (GPS) constellation, a Galileo constellation, a GLObalnaya NAvigatsionnaya Sputnikovaya Sistema (GLONASS) constellation, and a Compass constellation.

6. A navigation device comprising:
a receiver configured to receive a plurality of signals transmitted from a plurality of space-based satellites in each of a plurality of Navigation Satellite System (NSS) constellations; and a processing unit operatively coupled to the receiver and configured to calculate a respective first sub-solution for each of a plurality of first sub-sets of the plurality of signals in a constellation domain, the constellation domain including signals received from space-based satellites from all constellations except at least one constellation that corresponds to the respective first sub-solution;
wherein the processing unit is further configured to calculate a respective second sub-solution for each of a plurality of second sub-sets of the plurality of signals in a satellite domain, the satellite domain including signals received from all of the plurality of space-based satellites except at least one space-based satellite that corresponds to the respective second sub-solution; and
wherein the processing unit is further configured to identify an error in a navigation system based, at least in part, on the first sub-solutions in the constellation domain and on the second sub-solutions in the satellite domain.

7. The navigation device of claim 6, wherein the processing unit is configured to calculate a full-solution for the navigation system based on all of the plurality of signals from all of the NSS constellations;
wherein the processing unit is further configured to identify an error in the navigation system based on a comparison of the full-solution with each respective first sub-solution in the constellation domain and on a comparison of the full-solution with each respective second sub-solution in the satellite domain; and
wherein the processing unit is further configured to determine a protection level for each first sub-solution in the constellation domain and for each second sub-solution in the satellite domain, the processing unit further configured to select one of the determined protection levels as a total protection level.

8. The navigation device of claim 6, wherein the processing unit is further configured to calculate a full-solution for the navigation system based on all of the plurality of signals from all of the NSS constellations;
wherein the processing unit is configured to identify an error in the navigation system based on a comparison of one or more respective first sub-solutions in the constellation domain with the full-solution and on a comparison of each respective second sub-solution in the second satellite domain with a corresponding sub-solution in the constellation domain;
wherein the processing unit is further configured to determine a protection level for each first sub-solution in the plurality of first sub-solutions and in the plurality of second sub-solutions and to combine one of the protection levels for the plurality of first sub-solutions with a corresponding protection level for the plurality of second sub-solutions.

9. The navigation device of claim 6, further comprising an inertial measurement unit (IMU) configured to provide inertial measurements to the processing unit;
wherein the processing unit is further configured to calculate a respective constellation full-solution for each NSS constellation based on the inertial measurements and on the signals from each respective NSS constellation;
wherein the processing unit is further configured to use the respective constellation full-solutions in tracking loops of the receiver for the respective NSS constellations.

10. The navigation device of claim 6, wherein the processing unit is further configured to isolate and exclude signals from one or more of the plurality of space-based satellites based on an identified error in the navigation system.

11. The navigation device of claim 6, wherein the plurality of NSS constellations comprises two or more of a Global Positioning System (GPS) constellation, a Galileo constellation, a GLObalnaya NAvigatsionnaya Sputnikovaya Sistema (GLONASS) constellation, and a Compass constellation.

12. A program product comprising a non-transitory processor-readable medium on which program instructions are embodied, wherein the program instructions are configured, when executed by at least one programmable processor, to cause the at least one programmable processor to:
  calculate a respective first sub-solution for each of a plurality of first sub-sets of signals in a constellation domain that are received from a plurality of space-based satellites in each of a plurality of Navigation Satellite System (NSS) constellations, wherein each first sub-set of signals in the constellation domain is received from the plurality of space-based satellites from all constellations except at least one constellation that corresponds to the respective first sub-solution;
  calculate a respective second sub-solution for each of a plurality of second sub-sets of the signals in a satellite domain that are received from the plurality of space-based satellites, wherein each second sub-set of signals in the satellite domain is received from all of the plurality of space-based satellites except at least one space-based satellite that corresponds to the respective second sub-solution; and
  identify an error in a navigation system based, at least in part, on the respective sub-solutions in the constellation domain and on the respective sub-solutions in the satellite domain.

13. The program product of claim 12, wherein the program instructions are further configured to cause the at least one programmable processor to:
  calculate a full-solution for the navigation system based on all of the plurality of signals from all of the NSS constellations;
  identify an error in the navigation system based on a comparison of the full-solution with each respective first sub-solution in the constellation domain and on a comparison of the full-solution with each respective second sub-solution in the satellite domain;
  determine a protection level for each first sub-solution in the constellation domain and for each second sub-solution in the satellite domain; and
  select one of the determined protection levels as a total protection level.

14. The program product of claim 12, wherein the program instructions are further configured to cause the at least one programmable processor to:
  calculate a full-solution for the navigation system based on all of the plurality of signals from all of the NSS constellations;
  identify the error in the navigation system based on a comparison of one or more respective first sub-solutions in the constellation domain with the full-solution and a comparison of each respective second sub-solution in the satellite domain with a corresponding first sub-solution in the constellation domain;
  determine a protection level for each first sub-solution in a plurality of first sub-solutions and in a plurality of second sub-solutions; and
  combine one of the protection levels for the plurality of first sub-solutions with a corresponding protection level for the plurality of second sub-solutions.

15. The program product of claim 12, wherein the program instructions are further configured to cause the at least one programmable processor to:
  calculate a respective constellation full-solution for each NSS constellation based on inertial measurements from an inertial measurement unit and on the signals from each respective NSS constellation; and
  output the respective constellation full-solutions for use in tracking loops of a receiver for the respective NSS constellations.

16. The program product of claim 12, wherein the program instructions are further configured to cause the at least one programmable processor to isolate and exclude signals from one or more of the plurality of space-based satellites based on an identified error in the navigation system.

* * * * *